United States Patent [19]

Sera et al.

[11] Patent Number: 5,726,119
[45] Date of Patent: Mar. 10, 1998

[54] CATALYST FOR EXHAUST GAS PURIFICATION

[75] Inventors: Hisashi Sera, Hiroshima-ken; Shinobu Miyaura, Hiroshima; Toshiyuki Okabe, Hiroshima; Hiroshi Murakami, Hiroshima, all of Japan

[73] Assignee: Mazda Motor Corporation, Hiroshima, Japan

[21] Appl. No.: 338,212

[22] Filed: Nov. 9, 1994

Related U.S. Application Data

[63] Continuation of Ser. No. 982,670, Nov. 30, 1992, abandoned.

[30] Foreign Application Priority Data

Nov. 30, 1991 [JP] Japan ................. 3-317154

[51] Int. Cl.⁶ .................. B01J 35/04; B01J 37/08; B01J 32/00; B01J 37/00
[52] U.S. Cl. ............... 502/439; 502/527; 60/299; 29/890; 428/593; 422/180
[58] Field of Search ............... 60/299; 502/439, 502/527; 428/593; 29/890; 422/180

[56] References Cited

U.S. PATENT DOCUMENTS

| | | | |
|---|---|---|---|
| 4,381,590 | 5/1983 | Nonnenmann et al. | 29/890 |
| 4,425,304 | 1/1984 | Kawata et al. | 60/299 X |
| 4,521,947 | 6/1985 | Nonnenmann et al. | 29/890 |
| 4,711,009 | 12/1987 | Cornelison et al. | 29/157 R |
| 4,752,599 | 6/1988 | Nakamura et al. | 562/527 X |
| 4,888,320 | 12/1989 | Ihara et al. | 502/527 X |
| 5,084,361 | 1/1992 | Toyoda et al. | 502/439 X |
| 5,087,344 | 2/1992 | Wenske et al. | 204/256 |
| 5,094,073 | 3/1992 | Wörner | 60/299 |
| 5,103,641 | 4/1992 | Maus et al. | 60/299 |
| 5,130,100 | 7/1992 | Serizawa | 422/180 |
| 5,163,291 | 11/1992 | Hitachi et al. | 502/527 X |

FOREIGN PATENT DOCUMENTS

| | | |
|---|---|---|
| 63-44466 | 9/1988 | Japan . |
| 1-231946 | 9/1989 | Japan . |

*Primary Examiner*—Douglas J. McGinty
*Attorney, Agent, or Firm*—Martin Fleit, PA

[57] ABSTRACT

A catalyst carrier assembly for an automobile exhaust gas purifying device includes a smooth metal sheet and a pre-corrugated metal sheet wound alternately in a roll having a number of honeycomb convolutions. Each corrugation of the web-like pre-corrugated metal sheet is welded to the flat metal sheet at a plurality of points in the transverse direction during forming of the cylindrical roll. After forming the cylindrical roll, the cylindrical roll is heated so as to solder the web-like flat metal sheet and the web-like pre-corrugated metal sheet to each other at both of their end portions.

14 Claims, 4 Drawing Sheets

CATALYST FOR EXHAUST GAS PURIFICATION

This is a continuation of application Ser. No. 07/982,670, filed Nov. 30, 1992, abandoned.

BACKGROUND OF THE INVENTION

1. Field of the Invention

The present invention relates to a catalyst carrier assembly for an automobile exhaust gas purifying system and to manufacturing the catalyst carrier assembly. More particularly, this invention relates to a catalyst carrier assembly in which a honeycomb structure is used.

2. Description of Related Art

Automobile exhaust gas purifying systems typically have catalytic converters for removing nitrogen oxides, hydrocarbons, etc., from emissions. Such a catalytic converter typically includes a catalyst carrier made of, for instance, ceramics for carrying catalyst particles of precious metals through an alumina layer. However, the ceramic carrier is thick and has a large resistance against exhaust gas flowing through the catalytic converter. This raises back pressure of the engine.

It is a recent tendency to use catalyst carriers, made of thin metal plates or thin metal films, formed as honeycomb structures. Such a honeycomb catalyst carrier is provided by a smooth stainless steel sheet or web and a stainless steel pre-corrugated sheet or web wound round alternately so as to form a cylindrical roll with a number of honeycomb convolutions. In the honeycomb structured cylindrical catalytic carrier roll, the smooth stainless steel sheet and the stainless steel pre-corrugated sheet are soldered together along their opposite side margins. Such a honeycomb structured cylindrical catalytic carrier roll is well known to those skilled in the art from, for instance, Japanese Patent Publication No. 63-44,466.

The catalyst carrier has a disadvantage in that slippage between the smooth stainless steel sheet and the stainless steel pre-corrugated sheet occurs during soldering of the sheets together. The soldered portion of the catalyst carrier, therefore, is insufficient in structural strength. The structural strength, moreover, is worsened due to thermal stress and aging, so as to decrease the durability of the catalyst carrier structure. An increase in a soldered area of the catalytic converter improves the structural durability of the catalytic carrier. However, such an increase also increases the manufacturing cost of the catalyst carrier and reduces the performance efficiency of the catalytic carrier. In addition, since a metal honeycomb is generally low in structural strength or rigidity, the catalyst carrier is easily deformed or mechanically damaged due to axial inertia and/or thermal stress while the automobile is traveling.

SUMMARY OF THE INVENTION

It is, therefore, an object of the present invention to provide an improved catalyst carrier assembly, in which a smooth metal sheet and a pre-corrugated metal sheet are alternately wound round so as to form a porous cylindrical roll with a number of honeycomb convolutions, and a method of manufacturing the improved catalyst carrier assembly.

It is another object of the present invention to provide an improved catalyst carrier assembly, in which a smooth metal sheet and a pre-corrugated metal sheet wound round alternately are firmly secured together so as to provide an increase in structural durability of the catalyst carrier assembly, and a method of manufacturing the improved catalyst carrier assembly.

The foregoing objects of the present invention are achieved by providing a honeycomb structured catalyst carrier assembly for an automobile exhaust gas purifying device which comprises a smooth metal sheet and a pre-corrugated metal sheet wound round alternately in a roll with a number of honeycomb convolutions. Each corrugation of the web-like pre-corrugated metal sheet is welded to the flat metal sheet at a plurality of points in the transverse direction during forming of the cylindrical roll. After having formed the cylindrical roll, the cylindrical roll is heated so as to solder the web-like flat metal sheet and the web-like pre-corrugated metal sheet to each other at both end portions. A soldering material is applied to the end portions by an immersion coating.

BRIEF DESCRIPTION OF THE DRAWINGS

The foregoing and other objects and features of the present invention will be understood more clearly and fully from the following detailed description of the preferred embodiments thereof when considered in conjunction with the accompanying drawings. In the drawings, the same reference numbers have been used to denote the same or similar elements throughout.

DETAILED DESCRIPTION OF THE PREFERRED EMBODIMENTS

Because catalytic converters are well known, the present description will be directed in particular to elements forming part of, or cooperating with, the novel structure of a honeycomb structured catalyst carrier assembly in accordance with the present invention. It is to be understood that elements not specifically shown or described can take various form well known to those skilled in the art.

It should be noted that the words "front" and "rear" in this specification indicate an upstream side and a downstream side with respect to the honeycomb structured catalyst carrier assembly.

Figure 1:
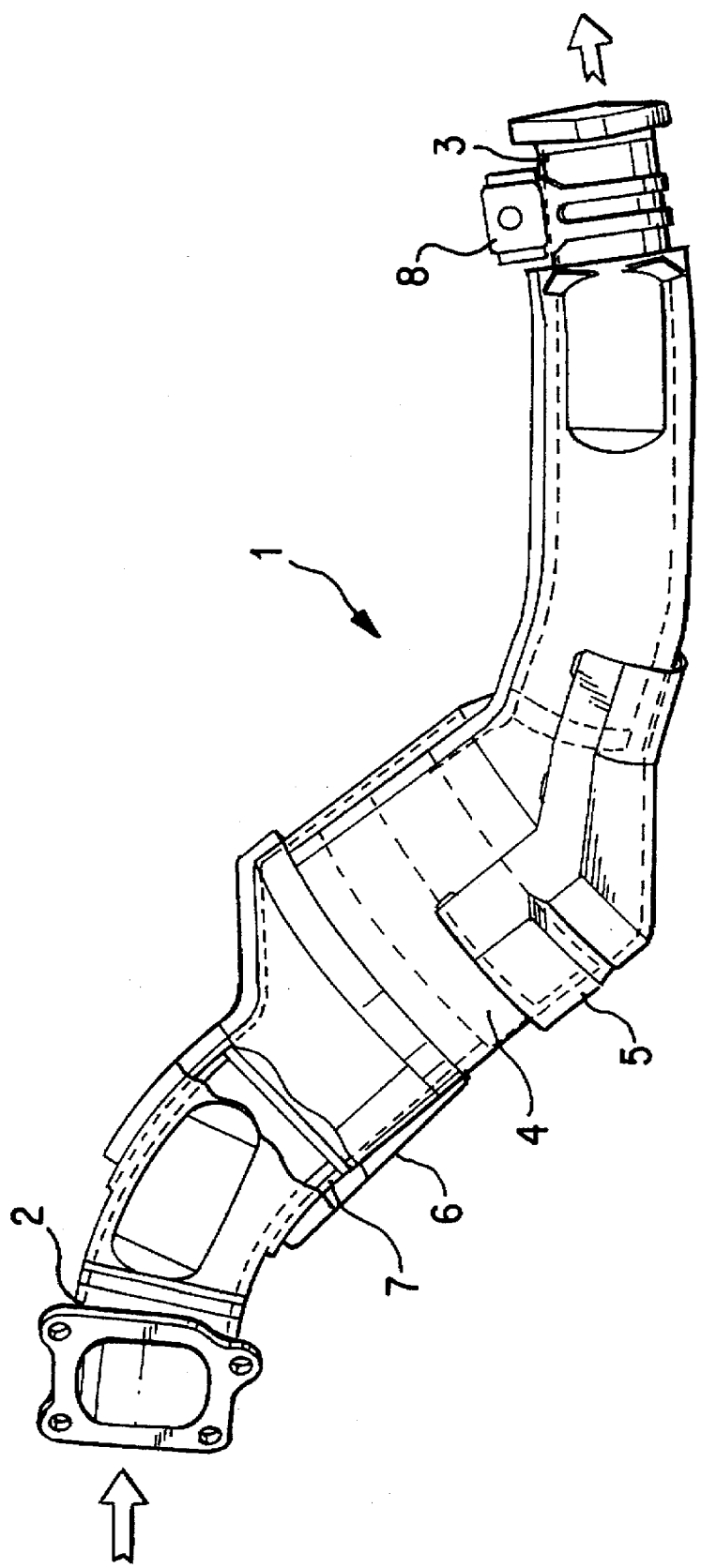
FIG. 1 is a schematic illustration of an automobile exhaust gas purification apparatus in which a honeycomb structured catalyst carrier assembly in accordance with a preferred embodiment of the present invention is installed.

Referring to the drawings in detail, and more particularly, to FIG. 1, an exhaust system for an automobile engine including a honeycomb structured catalyst carrier assembly in accordance with a preferred embodiment of the present invention is shown. The exhaust system 1 includes an upstream exhaust pipe 2 and a downstream exhaust pipe 3. The exhaust system 1 further includes a catalytic converter assembly 4, disposed between the upstream exhaust pipe 2 and the downstream exhaust pipe 3, for reducing or removing harmful components, such as nitrogen oxides (NOx), hydrocarbons (HC), etc., in exhaust gas which cause atmospheric pollution so as to purify the exhaust gas. Since the temperature of the catalytic converter assembly 4 becomes high during engine operation, it is provided with a heat isolator 7 covered by exterior covers 5 and 6. The exhaust system 1 is secured to a vehicle body (not shown) through fitting bracket 8.

Figure 2A:
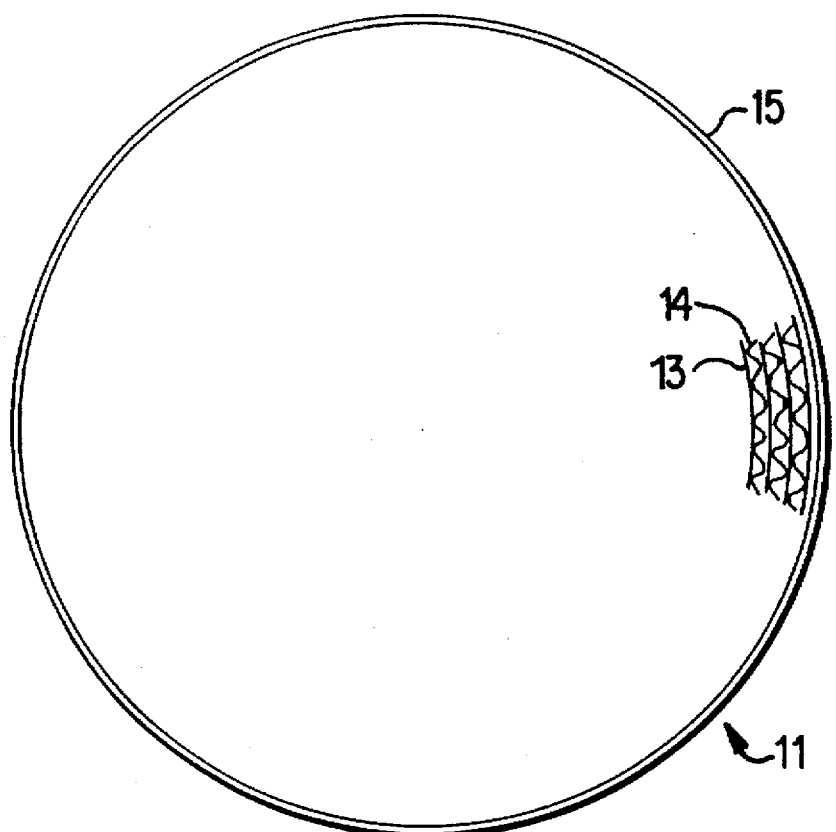
FIG. 2A is a front view of a front honeycomb structured catalyst carrier.
Figure 2B:
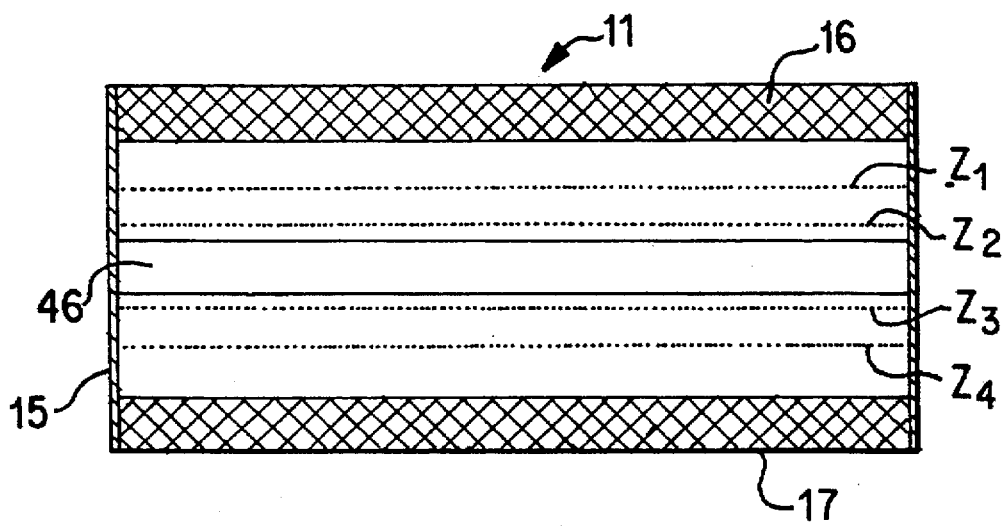
FIG. 2B is a cross-sectional view of the front honeycomb structured catalyst carrier.
Figure 3:
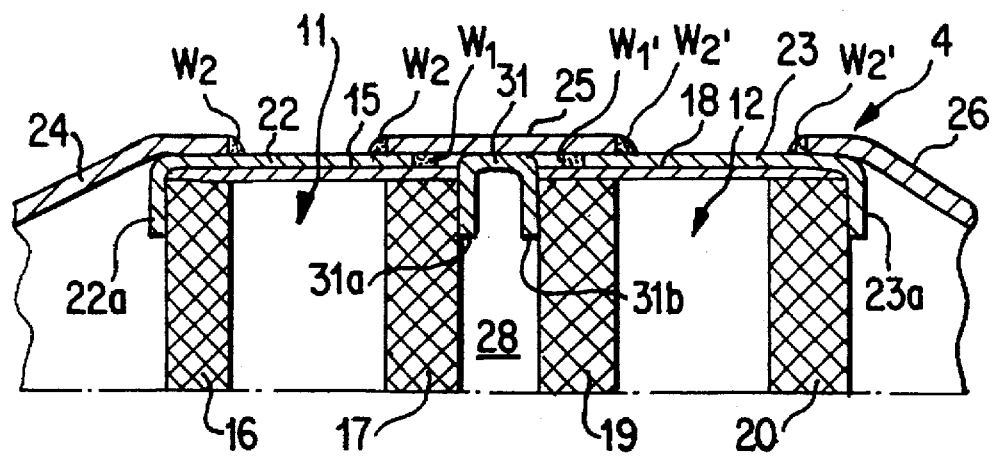
FIG. 3 is a lengthwise cross-sectional view of a honeycomb structured catalyst carrier assembly in accordance with a preferred embodiment of the present invention.
Figure 4:
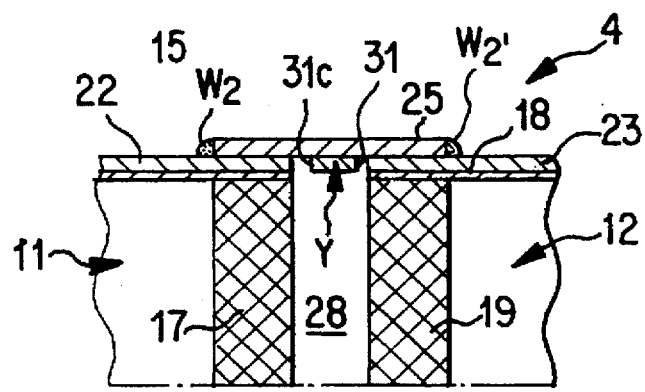
FIG. 4 is a lengthwise cross-sectional view showing an essential part of the honeycomb structured catalyst carrier assembly shown in FIG. 3.

Referring to FIGS. 2 to 4, the catalytic converter assembly 4 includes a front honeycomb structured catalyst carrier 11 and a rear honeycomb structured catalyst carrier 12 coaxially arranged at a predetermined separation in the direction of the exhaust gas stream. Each of the honeycomb structured catalyst carriers 11 and 12 is shaped as a generally cylindrical coil. The front honeycomb structured catalyst carrier 11, which will be described in detail later, has a number of turns or convolutions of a flat metal sheet 13 and a pre-corrugated metal sheet 14 wound round alternately so that sinusoidal corrugations extend in an axial direction of the cylindrical coil. The front honeycomb structured catalyst carrier 11 is soldered, or otherwise secured, to a front inner shell 15, shaped as a hollow cylindrical tube, at front and rear retainer portions 16 and 17. Similarly, the rear honeycomb structured catalyst carrier 12 has a number of convolutions of a flat metal sheet 13 and a pre-corrugated metal sheet 14 wound round alternately so that sinusoidal corrugations extend in an axial direction of the cylindrical coil. The rear honeycomb structured catalyst carrier 12 is soldered, or otherwise secured, to a rear inner shell 18 shaped as a hollow cylindrical tube at front and rear retainer portions 19 and 20. Adjacent convolutions of the flat metal sheet 13 and the pre-corrugated metal sheet 14 are soldered to each other.

In the front honeycomb structured catalyst carrier 11 and the rear honeycomb structured catalyst carrier 12, both the flat metal sheet 13 and the pre-corrugated metal sheet 14 are made of thin metal films, such as a ferrite group of stainless steel film, of approximately 50 microns in thickness. The front inner shell 15 and the rear inner shell 18 are also made of the same ferrite group of stainless steels as the flat metal sheet 13 and the pre-corrugated metal sheet 14. Consequently, there is no difference in coefficients of thermal expansion between the honeycomb structured catalyst carriers 11 and 12 and the inner shells 15 and 18, so that an increase in soldered structural strength is provided between the honeycomb structured catalyst carriers 11 and 12 and the inner shells 15 and 18. Each of the inner shells 15 and 18 has a wall thickness of, for instance, 1.0 mm, which is sufficient to protect the honeycomb structured catalyst carrier 11 or 12 against structural damage. Since the inner shells 15 and 18 receive axial force or load, which is caused by inertial force and thermal stress and applied to the honeycomb structured catalyst carriers 11 and 12, the honeycomb structured catalyst carriers 11 and 12 are prevented from slipping and/or being deformed, so as to greatly increase their structural durabilities. The inner shells 15 and 18 increase the stiffness of the catalytic converter assembly 4 as one unit.

The catalytic converter assembly 4 includes a front outer shell 22, shaped as a hollow cylindrical tube, having an axial length smaller than the axial length of the front inner shell 15. The front inner shell 15 is fitted within the front outer shell 22. The front outer shell 22 is welded, or otherwise secured, to the outer wall of the front inner shell 15 at equal angular separations such as, for instance, at every 60 degrees, as indicated by a reference character $W_1$ in FIG. 3. The front outer shell 22 is integrally formed with a plurality of front lips 22a, extending radially inward from its front end at equal angular separations such as, for instance, 60 degrees, for preventing the front inner shell 15 from axially slipping forward. The catalytic converter assembly 4 further includes a rear outer shell 23, shaped as a hollow cylindrical tube having an axial length smaller than the axial length of the rear inner shell 18. The rear inner shell 18 is fitted within the rear outer shell 23. The rear outer shell 23 is welded, or otherwise secured, to the outer wall of the rear inner shell 18 at equal angular separations such as, for instance, at every 60 degrees, as indicated by a reference character $W_1'$ in FIG. 3. The rear outer shell 23 is integrally formed with a plurality of rear lips 23a, extending radially inward from its front end at equal angular separations such as, for instance, 60 degrees, for preventing the rear inner shell 18 from axially slipping backward. Each and every front lip 22a of the front outer shell 22 is aligned in a straight axial line with a rear lip 23a of the rear outer shell 23. Further, each and every front lip 22a of the front outer shell 22 is aligned in a straight axial line with a welding point $W_1$ between the front inner shell 15 and the front outer shell 22. Similarly, each and every rear lip 23a of the rear outer shell 23 is aligned in a straight axial line with a welding point $W_1'$ between the rear inner shell 18 and the rear outer shell 23. In other words, the welding points $W_1$ and $W_1'$ are positioned between the front and rear lips 22a and 23a, respectively. Each of the outer shells 22 and 23 is made of an austenite group of stainless steels having high heat-resisting characteristics, such as a stainless steel known as SUS 304. Each of the outer shells 22 and 23 also has a wall thickness of, for instance, approximately 2.0 mm. Employing such outer shells 22 and 23 enhances the structural stiffness of the catalytic converter assembly 4.

The catalytic converter assembly 4 is housed in a generally frusto-conically shaped front casing 24, an annular intermediate casing 25, and a generally frusto-conically shaped rear casing 26, arranged in a straight line, at proper axial separations. Each of these casings 24–26 is made of an austenite group of stainless steels having high heat-resisting characteristics, such as a stainless steel known as SUS 304 or SUS 302B, and has a wall thickness of, for instance, approximately 2.0 mm. The front outer shell 22 is fitted in and welded, or otherwise secured, to the front casing 24 and the intermediate casing 25 at several angular points $W_2$. The rear outer shell 23 is fitted in and welded, or otherwise secured, to the rear casing 26 and the intermediate casing 25 at several angular points $W_2'$. Within the intermediate casing 25, the front and rear outer shells 22 and 23 are axially separated at an axial distance 28 by an annular separation ring 31 fitted in the intermediate casing. The separation ring 31 is integrally formed with a plurality of front lips 31a, extending radially inward from its front end at equal angular separations such as, for instance, 60 degrees, for preventing the front honeycomb structured catalyst carrier 11 from axially slipping backward. The front lips 31a are positioned so as to correspond to the front lips 22a of the front outer shell 22, respectively. Similarly, the separation ring 31 is integrally formed with a plurality of rear lips 31b, extending radially inward from its rear end at equal angular separations of, for instance, 60 degrees, for preventing the rear honeycomb structured catalyst carrier 12 from axially slipping foreward. The rear lips 31b are positioned so as to correspond to the rear lips 23a of the rear outer shell 23, respectively. Each and every one of the positionally corresponding lips 22a, 23a, 31a and 31b is aligned in a straight axial line. The separation ring 31 has narrow portions 31c between adjacent front lips 31a and between adjacent rear lips 31b, each of which has an axial width smaller than that of the remaining portions thereof where no lip is formed. The separation ring 31 is welded, or otherwise secured, to the intermediate casing 25 at points Y of the narrow portions 31c.

FIGS. 5-8 schematically illustrate the steps of providing or forming the honeycomb structured catalyst carrier 11 or 12. As is shown in these figures, a flat, smooth metal sheet 13 and a pre-corrugated metal sheet 14 are supplied at diametrically opposite positions $Q_1$ and $Q_2$, respectively, and firmly wound round as a coil with the aid of a motor driven mechanism (not shown) so as to form a number of alternate convolutions thereof in a well known manner. During winding of the flat metal sheet 13 and the pre-corrugated metal sheet 14, each corrugation of the pre-corrugated metal sheet 14 is secured to the flat sheet 13 by spot soldering, which is well known. An electrode roller 41 is disposed at the supplying position $Q_1$. There is also disposed a toothed electrode roller 42 at the supply position $Q_2$. The toothed electrode roller 42 has axially extending teeth having a predetermined tooth height and a predetermined pitch suitable for contacting bottoms of the corrugations of the pre-corrugated metal sheet 14. These electrode rollers 41 and 42 are electrically connected to an electric power source 44 through an electric wire 43.

Figure 5:
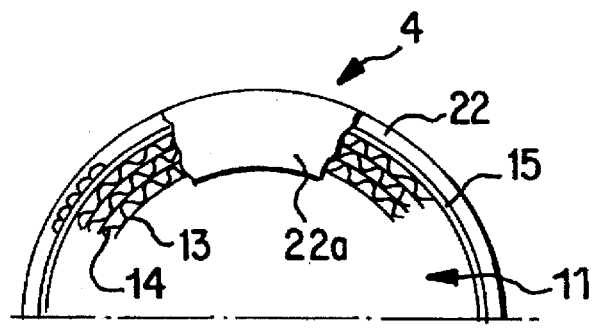
FIG. 5 is a front view of the honeycomb structured catalyst carrier assembly, partially cut away, shown in FIG. 3.
Figure 6:
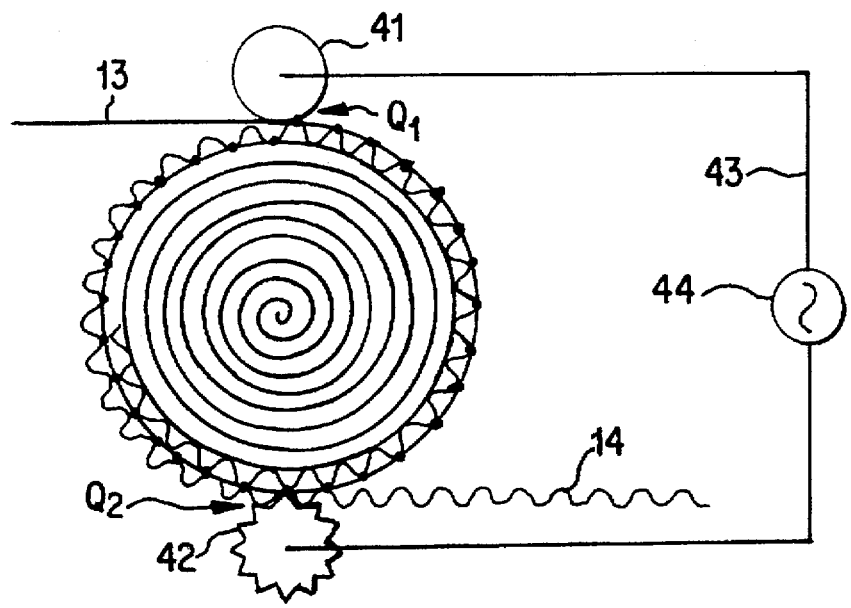
FIG. 6 is a schematic illustration of forming a honeycomb structured cylindrical roll for a honeycomb structured catalyst carrier.

The electrode roller 41 presses the flat metal sheet 13 to a ridge of a corrugation of the pre-corrugated metal sheet 14 at four points $Z_1$-$Z_4$ in the transverse direction of the metal sheet and performs electrical resistance welding during winding of the flat metal sheet 13 on the outermost convolution of the pre-corrugated metal sheet 14. On the other hand, the toothed electrode roller 42 presses a corrugation of the pre-corrugated metal sheet 14 so as to perform electrical resistance welding between the bottom of the convolution of the flat metal sheet 13 by the teeth at four points $Z_1$-$Z_4$ in the transverse direction of the sheet. In such a way, the flat metal sheet 13 and the pre-corrugated metal sheet 14 are firmly wound round as a coil into a number of alternate convolutions thereof. It is to be understood that one or both of the electrode rollers 41 and 42 may be replaced with laser beam welders or electron beam welders which are well known in the art. Also, the pre-corrugated metal sheet 14 may be formed with trapezoidal corrugations in place of sinusoidal corrugations. As is shown in FIG. 5, the welded points of the corrugations of the pre-corrugated metal sheet 14 to the flat metal sheet 13 are positioned in the same cross sections $Z_1$-$Z_4$.

Because the flat metal sheet 13 is pressed and welded to corrugations of the pre-corrugated metal sheet 14 at four points $Z_1$-$Z_4$ in the transverse direction by the electrode rollers 41 and 42, the front honeycomb structured catalyst carrier 11 is formed with a shallow concave surface in the center portion. After having formed the honeycomb structured catalyst carrier 11 as a honeycomb roll, the honeycomb structured catalyst carrier 11 is wound with a web-like metal sheet 46, such as a nickel alloy sheet, as a brazing material around the shallow concave surface portion between the points $Z_1$ and $Z_4$. The brazing metal sheet 46 has a width of approximately 10 mm. and a thickness which is less than a maximum depth of the shallow concave surface portion. Then, the honeycomb structured catalyst carrier 11, with the brazing metal sheet 46 wound therearound, is inserted into the front inner shell 15.

Figure 7A:
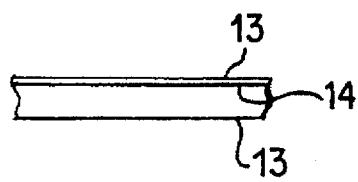
FIG. 7A is a lengthwise cross-sectional illustration showing part of a honeycomb structured cylindrical roll in which a flat metal sheet and a pre-corrugated metal sheet are not welded.
Figure 7B:
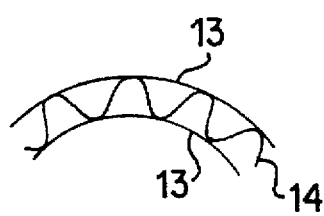
FIG. 7B is a cross-sectional illustration showing part of the honeycomb structured cylindrical roll shown in FIG. 7A.
Figure 8A:
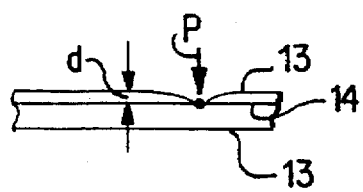
FIG. 8A is a lengthwise cross-sectional illustration showing part of a honeycomb structured cylindrical roll in which a flat metal sheet and a pre-corrugated metal sheet are welded by electrical resistance spot welding.
Figure 8B:
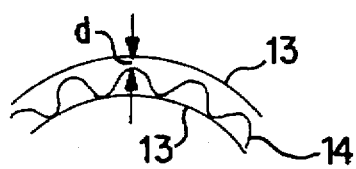
FIG. 8B is a cross-sectional illustration showing part of the honeycomb structured cylindrical roll shown in FIG. 8A.

The opposite end portions of the honeycomb structured catalyst carrier 11, in the front inner shell 15, are applied with coating layers of a soldering material by a well known immersion coating technique. This provides the front and rear retaining portions 16 and 17. For example, each end portion of the honeycomb structured catalyst carrier 11 in the front inner shell 15 may be immersed in a solution, or a paste, containing soldering material, such as nickel, to a predetermined axial distance of approximately 10 mm. These front and rear retaining portions 16 and 17 are separated from the outer spot lines $Z_1$ and $Z_4$, respectively. If corrugations of the pre-corrugated metal sheet 14 are not welded to the flat metal sheet 13, there are no separations or clearances between the flat metal sheet 13 and bottoms and ridges of the corrugations of the pre-corrugated metal sheet 14, as shown in FIG. 7. However, on both sides of each welded point P, there are axial separations d between the flat metal sheet 13 and bottoms and ridges of the corrugations of the pre-corrugated metal sheet 14, as shown in FIG. 8. Although such a separation may possibly weaken the strength of welding of each corrugation in the axial direction, the front and rear retaining portions 16 and 17 provide an increase in welding strength between the flat metal sheet 13 and the pre-corrugated metal sheet 14 and, hence, an increase in structural stiffness of the honeycomb structured catalyst carrier 11.

After having assembled the honeycomb structured catalyst carrier 11, the catalyst carrier assembly 11 is heated to a predetermined temperature which is higher than a melting point of the soldering material in a vacuum chamber and thereafter cooled. As a result of heating, the honeycomb structured catalyst carrier 11 is soldered between the flat metal sheet 13 and the pre-corrugated metal sheet 14 at the opposite end portions, namely, the front and rear retaining portions 16 and 17, by means of the coating layer of soldering material. Simultaneously, the honeycomb structured catalyst carrier 11 is soldered to the front inner shell 15 by means of the brazing sheet 46. Since the corrugations of the pre-corrugated metal sheet 14 are previously soldered to the flat metal sheet 13 at several points, there is no slippage between the two metal sheets 13 and 14 during vacuum soldering.

The rear honeycomb structured catalyst carrier 12 is formed and assembled and soldered to the rear inner shell 18 in the same manner as the front honeycomb structured catalyst carrier 11.

It is to be understood that although the present invention has been described in detail with respect to a preferred embodiment thereof, various other embodiments and variants may occur to those skilled in the art by following the teachings herein. Any such other embodiments and variants which fall within the scope and spirit of the invention are intended to be covered by the following claims.

What is claimed is:

1. A method of forming a catalyst carrier for use with an automobile exhaust gas purification system comprising the steps of:

winding a web-like pre-corrugated metal sheet, formed with corrugations extending in a transverse direction thereof, and a web-like flat metal sheet alternately so as to form a cylindrical roll having a number of honeycomb convolutions;

fixing said web-like pre-corrugated metal sheet and said web-like flat metal sheet in relative positions by welding each corrugation of said web-like pre-corrugated metal sheet to said flat metal sheet at a plurality of points in said transverse direction as said cylindrical roll is formed;

applying a soldering material to opposite end portions of said cylindrical roll after welding each corrugation of said web-like pre-corrugated metal sheet to said flat metal sheet; and heating said cylindrical roll so as to solder said web-like flat metal sheet and said web-like pre-corrugated metal sheet to each other at said end portions.

2. A method as defined in claim 1, wherein said soldering material is applied to said end portions of said cylindrical roll by immersion coating.

3. A method as defined in claim 1, wherein each corrugation of said web-like pre-corrugated metal sheet is welded to said flat metal sheet by electrical resistance spot welding.

4. A method as defined in claim 1, wherein said cylindrical roll is heated in a vacuum for soldering said web-like flat metal sheet and said web-like pre-corrugated metal sheet to each other at said end portions.

5. A method as defined in claim 1, and further comprising the steps of wrapping a web-like brazing sheet around a center portion of said cylindrical roll and fitting said cylindrical roll into a hollow cylindrical shell before applying said soldering material to said end portions of said cylindrical roll.

6. A method of forming a catalyst carrier for use with an automobile exhaust gas purification system comprising the steps of:

winding a web-like pre-corrugated metal sheet, formed with corrugations extending in a transverse direction thereof, and a web-like flat metal sheet alternately so as to form a cylindrical roll having a number of convolutions of honeycomb layers;

fixing said web-like pre-corrugated metal sheet and said web-like flat metal sheet in relative positions by welding each corrugation of said web-like pre-corrugated metal sheet to said flat metal sheet at a plurality of points in said transverse direction as said cylindrical roll is formed;

wrapping a web-like brazing sheet around a center portion of said cylindrical roll after welding each corrugation of said web-like pre-corrugated metal sheet to said flat metal sheet;

fitting said cylindrical roll into a hollow cylindrical shell;

applying a soldering material to opposite end portions of said cylindrical roll after wrapping the web-like brazing sheet around the center portion of said cylindrical roll; and heating said cylindrical roll in said cylindrical hollow shell so as to solder said cylindrical roll to said hollow cylindrical shell.

7. A method as defined in claim 6, wherein each corrugation of said web-like pre-corrugated metal sheet is welded to said flat metal sheet by electrical resistance spot welding.

8. A method as defined in claim 1, wherein said cylindrical roll is heated in a vacuum for soldering said cylindrical roll to said hollow cylindrical shell.

9. A method as defined in claim 1, wherein said web-like pre-corrugated metal sheet is axially separated from said web-like flat metal sheet on both sides of each of said points.

10. A method as defined in claim 6, wherein said center portion is disposed between adjacent points at which said web-like pre-corrugated metal sheet is welded to said flat metal sheet.

11. A method of forming a catalyst carrier for use with an automotive gas purification system comprising the steps of:

winding a web-like pre-corrugated sheet, formed with corrugations extending in a transverse direction thereof, and a web-like flat metal sheet alternately so as to form a cylindrical roll having a number of honeycomb convolutions;

fixing said web-like pre-corrugated metal sheet and said web-like flat metal sheet in relative positions by welding each corrugation of said web-like pre-corrugated sheet to said web-like flat metal sheet at a plurality of points in said transverse direction as said cylindrical roll is formed;

applying soldering material to opposite end portions of said cylindrical roll after welding each corrugation of said web-like pre-corrugated sheet to said web-like flat metal sheet;

fitting said cylindrical roll into a hollow cylindrical shell, having a front end with lips extending radially inside, by welding said cylindrical roll to said hollow cylindrical shell at a plurality of points axially behind said lips; and heating said cylindrical roll so as to solder said web-like pre-corrugated sheet and said web-like flat metal sheet to each other at said end portions.

12. A method as defined in claim 1, wherein positions of said opposite end portions are separated in said transverse direction from positions of said plurality of points.

13. A method as defined in claim 6, wherein positions of said opposite end portions are separated in said transverse direction from positions of said plurality of points.

14. A method as defined in claim 11, wherein positions of said opposite end portions are separated in said transverse direction from positions of said plurality of points.

* * * * *